United States Patent Office 3,152,126
Patented Oct. 6, 1964

3,152,126
NEW DIESTERS OF PHENOTHIAZINES
Harry Louis Yale, New Brunswick, N.J., assignor to Olin Mathieson Chemical Corporation, New York, N.Y., a corporation of Virginia
No Drawing. Filed Jan. 14, 1963, Ser. No. 251,012
2 Claims. (Cl. 260—243)

This invention relates to new diesters of phenothiazines having valuable therapeutic properties, pharmaceutical compositions containing the same, and processes for the preparation thereof.

The therapeutically active compounds of this invention include phenothiazines of the general formula

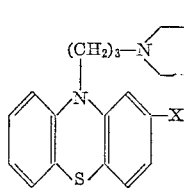

wherein $n$ is a positive integer of less than 3; X is hydrogen, halogen (preferably chloro), trifluoromethyl, lower alkyl, lower alkoxy, lower alkanoyl, lower alkyl mercapto, trifluoromethylmercapto, and lower alkylsulfonyl (preferably, methylsulfonyl); Y is alkyl, alkenyl, alkynyl, monocyclic or bicyclic cycloalkyl, monocyclic or bicyclic $(Z)_r$-cycloalkyl or $(Z)_r$-cycloalkenyl, wherein Z is lower alkyl or hydrogen and $r$ is 0, 1, 2 or 3. The terms alkyl, alkenyl and alkynoyl as employed herein include both straight and branched chain radicals. The preferred compounds of this invention are those wherein X is chloro or trifluoromethyl and Y is alkyl or alkenyl or alkynyl radical of from 2 to 17 carbon atoms, inclusive. Particularly preferred are those compounds wherein X is trifluoromethyl and Y is an alkyl or an alkenyl radical of from six to fourteen carbon atoms.

Since the compounds of this invention are especially adapted for parenteral administration, as more fully discussed hereinafter, they are preferably administered in the form of their free esters. The compounds, however, readily form acid-addition salts, which may be utilized in the preparation of the free esters or the purification thereof and can also be used for parenterally administered formulations. Acids useful for preparing the acid-addition salts include, inter alia, inorganic acids such as the hydrohalic acids (e.g., hydrochloric and hydrobromic acid), sulfuric acid, nitric acid and phosphoric acid, and organic acids such as oxalic, tartaric, citric, pamoic, acetic, adipic, maleic, fumaric and succinic acid.

The compounds of this invention are therapeutically active substances which are utilizable as tranquilizing (or ataractic) agents. These compounds differ from the corresponding lower alkanoic acid ester derivatives or the free hydroxyl derivatives in that they are significantly longer acting when administered parenterally and thus, when injected subcutaneously, for example, in a suitable vehicle, yield a long acting tranquilizing drug.

The compounds of the invention can be prepared by interacting a compound of the general formula

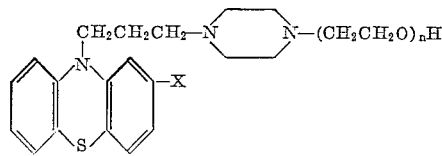

wherein X is as hereinbefore defined and $n$ is a positive integer of less than 3 with an acyl dihalides (preferably acyl dichlorides) of the formula: halide-CO—Y—CO-halide, wherein Y is as hereinbefore defined; the reaction preferably being conducted in an organic solvent, such as chloroform, for the reactants. Among the suitable phenothiazine reactants may be mentioned 10-[3-(2-hydroxyethyl)piperazinopropyl]phenothiazine; 10-[3-(2-hydroxyethyl)piperazinopropyl] - 2-halo-phenothiazines, such as 10-[3-(2-hydroxyethyl)piperazinopropyl]-2-chlorophenothiazine; 10-[3-(2-hydroxyethyl)piperazinopropyl]-2-trifluoromethylphenothiazine; 10 - [3-(2-hydroxyalkoxyalkyl) - piperazinopropyl] - 2-halophenothiazines, such as 10-[3-(2-hydroxyethoxyethyl)piperazinopropyl]-2-chlorophenothiazine, 10-[3-(2-hydroxyethoxyethyl)piperazinopropyl]-2-trifluoromethylphenothiazine; 10-[3-(2-hydroxyethyl)piperazinopropyl] - 2-(lower alkyl)phenothiazines, such as 10-[3-(2-hydroxyethyl)piperazinopropyl]-2-methylphenothiazine; 10-[3-(2-hydroxyethyl)piperazinopropyl]-2-(lower alkoxy)phenothiazines, such as 10-[3 - (2-hydroxyethyl)piperazinopropyl]-2-methoxyphenothiazine; 10 - [3-(2-hydroxyethyl)piperazinopropyl]-2-(lower alkanoyl)phenothiazines, such as 10-[3-(2-hydroxyethyl)piperazinopropyl] - 2-propionylphenothiazine; 10 - [3-(2-hydroxyethyl)piperazinopropyl]-2-(lower alkyl mercapto)phenothiazines, such as 10-[3-(2-hydroxyethyl)piperazinopropyl] - 2 - methylmercaptophenothiazine; 10 - [3 - (2-hydroxyethyl)piperazinopropyl]-2-trifluoromethylmercaptophenothiazine and 10-[(2-hydroxyethyl)piperazinopropyl] - 2-methylsulfonylphenothiazine.

All of the desired acyl dihalides employable in the practice of this invention can be prepared by the reaction of the respective hydrocarbon dicarboxylic acids with thionyl halide, preferably thionyl chloride, alone, or in a suitable anhydrous solvent, e.g., chloroform, benzene and the like. Among the suitable acyl dihalide reactants which may be thus prepared and employed in this invention may be mentioned the acyl dihalides (preferably the acyl dichlorides) of such hydrocarbon dicarboxylic acids as the saturated dicarboxylic acids, for example, succinic acid, glutaric acid, adipic acid, pimelic acid, azelaic acid, sebacic acid, nonanedicarboxylic acid, decane-dicarboxylic acid, undecane-dicarboxylic acid, dodecane-dicarboxylic acid; the unsaturated dicarboxylic acids, for example, maleic acid, fumaric acid, citraconic acid, mesaconic acid, itaconic acid, decynedioic acid, dodecyndioic acid, dodecendioic acid; monocyclic dicarboxylic acids, such as phthalic acid, isophthalic acid, terephthalic acid, hexahydrophthalic acid, hexahydroterephthalic acid, apocamphoric acid, camphoric acid, cyclopentanedicarboxylic acid, cyclohexanedicarboxylic acid, cyclopentenedicarboxylic acid, cyclooctenedicarboxylic acid; bicyclic dicarboxylic acids, such as naphthalenedicarboxylic acid, biphenyldicarboxylic acid, spiroalkane dicarboxylic acids, e.g., spiroheptane dicarboxylic acid; substituted dicarboxylic acids, such as (lower alkyl) saturated dicarboxylic acids, for example, 2,3-diethyl succinic acid, 2-butyl-2-hexylsuccinic acid, 2,3,4-trimethylglutaric acid, 3,3-diethylglutaric acid, 3,4-diethyladipic acid, 2-ethylsebacic acid, 4-ethylnonane-dicarboxylic acid, 2-methylhexadecanedioic acid; (lower alkyl) unsaturated dicarboxylic acids, for example, 4,5-dimethyl-3- hexene-1,5-dicarboxylic acid; (lower alkyl)cycloalkane dicarboxylic acids, for example, 2,5-dimethylcyclopentane dicarboxylic acid, 1,4-cyclohexane dibutyric acid; (lower alkyl)cycloalkenyl dicarboxylic acids, for example, 4,5-dimethyl-3-hexene-1,5-dicarboxylic acid; 1,1,2-trimethyl-3-cyclopentoic-1,3-dicarboxylic acid and other like dicarboxylic acids.

The free bases, when initially formed, can be converted to acid-addition salts by treatment with the desired acid. This reaction is preferably conducted in an inert organic solvent under substantially anhydrous conditions by treating the base with the acid, whereby the acid-addition salt is formed.

To prepare the preferred compositions of this invention, the compounds of this invention, in the form of their free basic esters or acid addition salts, are dissolved or suspended in a parenterally acceptable liquid vehicle. For prolonged action, the compounds are formulated in an oil such as peanut oil, sesame oil, cottonseed oil, corn oil, soybean oil, synthetic glycerol esters of long chain fatty acids, and mixtures of these and other oils; the compound preferably being present in a concentration to give about 20 mg. to about 300 mg. of the compound per ml. and administered subcutaneously.

The following examples illustrate the invention (all temperatures being in centigrade):

EXAMPLE 1

*Acid Chloride of Azelaic Acid*

30 gm. of azelaic acid and 50 ml. of thionyl chloride are mixed, kept one hour at room temperature, refluxed one hour, concentrated until free of thionyl chloride and the residue distilled to give the acid chloride of azelaic acid, B.P. about 128–130° C. (3 mm.).

Similarly, following the procedure set forth in Example 1, but substituting an equivalent amount of thionyl bromide for thionyl chloride, there is obtained the azelaic acid bromide.

Similarly, following the procedure set forth in Example 1 but substituting an equivalent amount of citraconic acid, decynedioic acid, dodecenedioic acid, terephthalic acid, cyclopentanedicarboxylic acid, cylopentenedicarboxylic acid, cyclooctenedicarboxylic acid, naphthalenedicarboxylic acid, 2,3,4-trimethylglutaric acid, 4,5-dimethyl-3-hexene-1,5-dicarboxylic acid, 2,5-dimethylcyclopentane dicarboxylic acid, 1,2,2-trimethyl-3-cyclopentene-1,3-dicarboxylic acid, the acid chlorides of the respective acids are obtained.

EXAMPLE 2

*Azelaic Acid Diester of 10-[3-(2-Hydroxyethyl)Piperazinopropyl]-2-Trifluoromethylphenothiazine*

To 89.3 g. of 10-[3-(2-hydroxyethyl)piperazinepropyl]-2-trifluoromethylphenothiazine in one liter of dry chloroform is added dropwise 24.4 g. of azelaic acid chloride in 100 ml. of dry chloroform. The mixture is then refluxed for two hours and concentrated until free of chloroform. The residual oil is added to a suspension of 40 g. of sodium bicarbonate in 400 ml. of ice-water and 500 ml. of ether. The mixture is shaken carefully until no further evolution of carbon dioxide occurs, the ether layer is separated, dried and concentrated to give 10-[3-(2-hydroxyethyl)piperazinepropyl]-2-trifluoromethylphenothiazine, diester with azelaic acid, as a yellow viscous oil.

Similarly, following the procedure set forth in Example 2 but substituting an equivalent amount of 10-[3-(2-hydroxyethoxyethyl)piperazinopropyl]-2-trifluoromethylphenothiazine for 10-[3-(2-hydroxyethyl)piperazinopropyl]-2-trifluoromethylphenothiazine there is obtained 10-[3-(2-hydroxyethoxyethyl)piperazinopropyl]-2-trifluoromethylphenothiazine, diester with azelaic acid.

EXAMPLE 3

*10-[3-(2-Hydroxyethyl)Piperazinopropyl]-2-Trifluoromethylphenothiazine, Diester With Azelaic Acid, Tetrahydrochloride*

10.6 g. of the product of Example 2 is dissolved in 50 ml. of dry chloroform, the solution is cooled, and 40 ml. of a 1 molar solution of hydrogen chloride in anhydrous ether is added dropwise with stirring. The clear solution which forms is evaporated free of solvents and the residual oil induced to granulate. The resultant solid is recrystallized from anhydrous acetone-ether to yield 10-[3-(2-hydroxyethyl)piperazinopropyl]-2-trifluoromethylphenothiazine, diester with azelaic acid, tetrachloride, having a melting point of about 130–133° C.

EXAMPLE 4

*10-[3-(2-Hydroxyethyl)Piperazinopropyl]-2-Trifluoromethylphenothiazine, Diester With Azelaic Acid, Salt With 4 Moles of Maleic Acid*

10.6 g. of the product of Example 1 is dissolved in 50 ml. of dry chloroform, the solution is cooled, and a saturated solution of 4.64 g. of maleic acid in dry acetone is added dropwise. The resultant precipitated solid is filtered and recrystallized from dry acetone to yield 10-[3-(2-hydroxyethyl)piperazinopropyl]-2-trifluoromethylphenothiazine, diester with azelaic acid, salt with 4 moles of maleic acid, having a M.P. of about 190–191° C.

EXAMPLE 5

*10-[3-(2-Hydroxyethyl)Piperazinopropyl]-2-Trifluoromethylphenothiazine, Diester With Naphthalene-1,8-Dicarboxylic Acid*

Following the procedure set forth in Example 2, but substituting an equivalent amount of naphthalene-1,8-dicarboxylic acid chloride for azelaic acid chloride, there is obtained the naphthalene-1,8-dicarboxylic acid diester of 10-[3-(2-hydroxyethyl)piperazinopropyl]-2-trifluoromethylphenothiazine.

Similarly, following the procedure set forth in Example 2, but substituting equivalent amounts of terephthalic acid chloride, decynedioic acid chloride, dodecenedioic acid chloride, cyclopentene dicarboxylic acid chloride, 2,3,4-trimethylglutaric acid chloride and 2,5-dimethylcyclopentane dicarboxylic acid chloride for the azelaic acid chloride, there is obtained the corresponding terephthalic acid diester, decynedioic acid diester, dodecenedioic acid diester, cyclopentenedicarboxylic acid diester, 2,3,4-trimethylglutaric acid diester, and 2,5-dimethylcyclopentanedicarboxylic acid diester of 10-[3-(2-hydroxyethyl)piperazinopropyl]-2-trifluoromethylphenothiazine.

These diesters may then be converted to the acid-addition salts thereof by treatment in accordance with the procedures set forth in Example 3 or 4.

EXAMPLE 6

*Parenteral Formulation A*

50 g. of the Azelaic acid diester of 10-[3-(2-hydroxyethyl)piperazinopropyl]-2-trifluoromethylphenothiazine obtained as in Example 1 is dissolved in 1000 ml. of sesame oil, U.S.P. The solution is sterile filtered and packaged aseptically for parenteral administration.

EXAMPLE 7

*Parenteral Formulation B*

A suspension of 56 g. of micronized azelaic acid diester of 10-[3-(2-hydroxyethyl)piperazinopropyl]-2-trifluoromethylphenothiazine, prepared as in Example 1, 0.36 g. of lecithin, N.F., 0.18 g. of Tween 80 and 1.68 g. of aluminum monostearate (purified), diluted to 1000 ml. with sesame oil is prepared under sterile conditions and packaged aseptically for parenteral administration.

EXAMPLE 8

Parenteral Formulation C

A solution of 50 g. of the azelaic acid diester of 10-[3-(2-hydroxyethyl)piperazinopropyl] - 2 - trifluoromethylphenothiazine, 1.5 g. aluminum monostearate (purified) diluted to 1000 ml. with sesame oil, U.S.P., is sterile filtered and packaged aseptically for parenteral administration.

What is claimed is:

1. A compound selected from the group consisting of bases of the formula

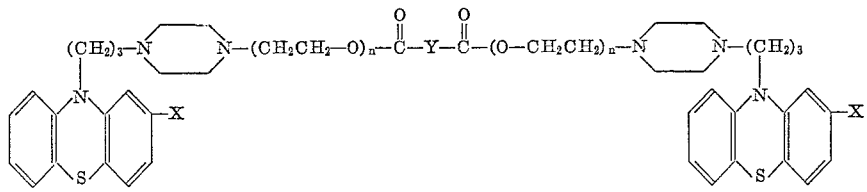

wherein $n$ is a positive integer less than 3; X is selected from the group consisting of hydrogen, halogen, trifluoromethyl, lower alkyl, lower alkoxy, lower alkanoyl, lower alkyl mercapto, trifluoromethylmercapto, and lower alkylsulfonyl; and Y is selected from the group consisting of alkyl, alkenyl, alkynyl, $(Z)_r$-cycloalkyl, $(Z)_r$-cycloalkenyl, bicyclic-$(Z)_r$-cycloalkyl and bicyclic $(Z)_r$-cycloalkenyl, wherein Z is selected from the group consisting of hydrogen and lower alkyl and $r$ is selected from the group consisting of 0, 1, 2 and 3.

2. 10[3-(2-hydroxyethyl)piperazinopropyl]-2-trifluoromethylphenothiazine diester with azelaic acid.

References Cited in the file of this patent

UNITED STATES PATENTS

| | | |
|---|---|---|
| 2,744,851 | Halpern et al. | May 8, 1956 |
| 3,058,979 | Ullyot | Oct. 16, 1962 |

OTHER REFERENCES

Yale et al.: J. Med. Pharm. Chem., vol. 6, pages 347–350 (July 1963).